(12) United States Patent
Takita

(10) Patent No.: US 12,151,550 B2
(45) Date of Patent: Nov. 26, 2024

(54) SHUTTER DEVICE

(71) Applicant: Valeo Japan Co., Ltd., Saitama (JP)

(72) Inventor: Hiroyasu Takita, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 243 days.

(21) Appl. No.: 17/915,731

(22) PCT Filed: Mar. 25, 2021

(86) PCT No.: PCT/JP2021/012451
§ 371 (c)(1),
(2) Date: Sep. 29, 2022

(87) PCT Pub. No.: WO2021/200522
PCT Pub. Date: Oct. 7, 2021

(65) Prior Publication Data
US 2023/0125506 A1    Apr. 27, 2023

(30) Foreign Application Priority Data

Apr. 1, 2020 (JP) .................................. 2020-066201

(51) Int. Cl.
*B60K 11/08* (2006.01)
*F16H 21/22* (2006.01)
(52) U.S. Cl.
CPC ............ *B60K 11/085* (2013.01); *F16H 21/22* (2013.01)
(58) Field of Classification Search
CPC .............................. B60K 11/085; F16H 21/22
(Continued)

(56) References Cited

U.S. PATENT DOCUMENTS 10,647,194 B1 *  5/2020  Burtch .................. B60K 11/085
2013/0025952 A1 *  1/2013  Kitashiba ............. B60K 11/085
                                              180/68.1
(Continued)

FOREIGN PATENT DOCUMENTS

DE    102014103667 A1    10/2014
DE    102019119353 A1     1/2020
(Continued)

OTHER PUBLICATIONS

Extended European Search Report issued in corresponding European Patent Application No. 21779727.3 mailed Apr. 10, 2024 (7 pages).

*Primary Examiner* — Tho V Duong
(74) *Attorney, Agent, or Firm* — Osha Bergman Watanabe & Burton LLP

(57) ABSTRACT

A vehicle shutter device includes first and second flaps, one actuator, and a link mechanism. The link mechanism includes a connecting rod that couples the flaps to each other such that the flaps rotate in synchronization with each other. The shutter device is provided with stoppers configured to prohibit each of the flaps from being displaced beyond a normal opening and closing range when the link mechanism is in a normal state. When coupling between the connecting rod and the first flap is released in the first pivotally attaching portion in a state where coupling between the connecting rod and the second flap is maintained in the second pivotally attaching portion, the actuator is allowed to rotate beyond a normal rotation range of the actuator corresponding to the normal opening and closing ranges of the first and second flaps.

4 Claims, 6 Drawing Sheets

(58) Field of Classification Search
USPC .......................................................... 165/96
See application file for complete search history.

(56) References Cited

U.S. PATENT DOCUMENTS

| | | | | |
|---|---|---|---|---|
| 2018/0347449 | A1* | 12/2018 | Clapie | ...................... F01P 11/10 |
| 2020/0391685 | A1* | 12/2020 | Manhire | ................ B60K 11/08 |
| 2021/0008953 | A1* | 1/2021 | Gerber | ................ F24F 13/1426 |
| 2021/0230936 | A1* | 7/2021 | Manhire | ................... F01P 7/10 |
| 2022/0176810 | A1* | 6/2022 | Muller et al. | ......... B60K 11/085 |
| 2022/0258597 | A1* | 8/2022 | Schneider | ............... B60R 19/52 |
| 2023/0406419 | A1 | 12/2023 | Maestre Serrano | |

FOREIGN PATENT DOCUMENTS

| | | |
|---|---|---|
| DE | 102018218570 A1 | 4/2020 |
| JP | 2016-147552 A | 8/2016 |

\* cited by examiner

SHUTTER DEVICE

TECHNICAL FIELD

The present invention relates to a shutter device that is disposed in a front portion of a front room of a vehicle and that is for adjusting an amount of outside air introduced into the front room.

BACKGROUND ART

An automatic vehicle has, on a front side thereof, a room called an engine room, a motor room, or the like (hereinafter, referred to as a "front room" for convenience of description in the present description) separated from a vehicle compartment for an occupant to ride in. The front room stores a prime mover such as an internal combustion engine or an electric motor, a battery, a refrigeration cycle of an air conditioner, and the like. The front room has a front surface provided with a front grille having an opening for introducing the outside air into the front room.

In recent years, in order to improve aerodynamic characteristics of the vehicle, to achieve efficient warming-up, and the like, the front grille is provided with a shutter device that can be opened and closed, and the front grille is closed depending on a situation. Patent Literature 1 describes such a shutter device. The shutter device includes a plurality of closing elements (also referred to as flaps, fins, or the like) arranged in an up and down direction. Each of these closing elements is rotatably supported by a frame, and is pivotally attached to a common arm. By driving the arm by an actuator, the closing elements rotate in conjunction with each other and the front grille is opened and closed.

In a shutter device of this form, when coupling between any one of the closing elements and the arm is released, the one closing element cannot move. If the released closing element does not interfere with movement of the other closing elements, it is difficult to recognize that the one closing element is released. In this case, a situation that an amount of air passing through the front grille is different from an intended amount may continue for a long period of time.

CITATION LIST

Patent Literature

Patent Literature 1: JP-A-2016-147552

SUMMARY OF INVENTION

Technical Problem

An object of the invention is to provide a vehicle shutter device having a function capable of, when an abnormality occurs in a link mechanism that transmits power from an actuator to flaps, easily detecting the occurrence of the abnormality.

Solution to Problem

An embodiment of the present invention provides a vehicle shutter device including: a support frame; a first flap attached to the support frame so as to be rotatable about a first rotation axis; a second flap attached to the support frame so as to be rotatable about a second rotation axis parallel to the first rotation axis; one actuator configured to generate a driving force for rotating the first flap and the second flap; and a link mechanism configured to transmit the driving force generated by the actuator to the first flap and the second flap, the link mechanism including a connecting rod that couples the first flap and the second flap to each other such that the first flap and the second flap rotate in synchronization with each other, a first pivotally attaching portion of the connecting rod being pivotally attached to the first flap, a second pivotally attaching portion being pivotally attached to the second flap, in which the shutter device further includes a stopper configured to, when the link mechanism is in a normal state, prohibit each of the first flap and the second flap from being displaced beyond normal opening and closing ranges between fully open positions and fully closed positions, and the link mechanism is configured such that when coupling between the connecting rod and the first flap is released in the first pivotally attaching portion in a state where coupling between the connecting rod and the second flap is maintained in the second pivotally attaching portion, the actuator is allowed to rotate beyond a normal rotation range corresponding to the normal opening and closing ranges of the first flap and the second flap.

Advantageous Effects of Invention

According to the embodiment, when the coupling between the flap and the link mechanism is released, the actuator is allowed to rotate beyond the normal rotation range. Therefore, the abnormality in the link mechanism can be detected based on a detection result of a rotation position detector of the actuator.

shows a state of the link mechanism when flaps are in a fully closed state, and (B) shows a state of the link mechanism when the flaps are in a fully open state.

DESCRIPTION OF EMBODIMENTS

Hereinafter, an embodiment of the invention will be described with reference to drawings.

Figure 1:
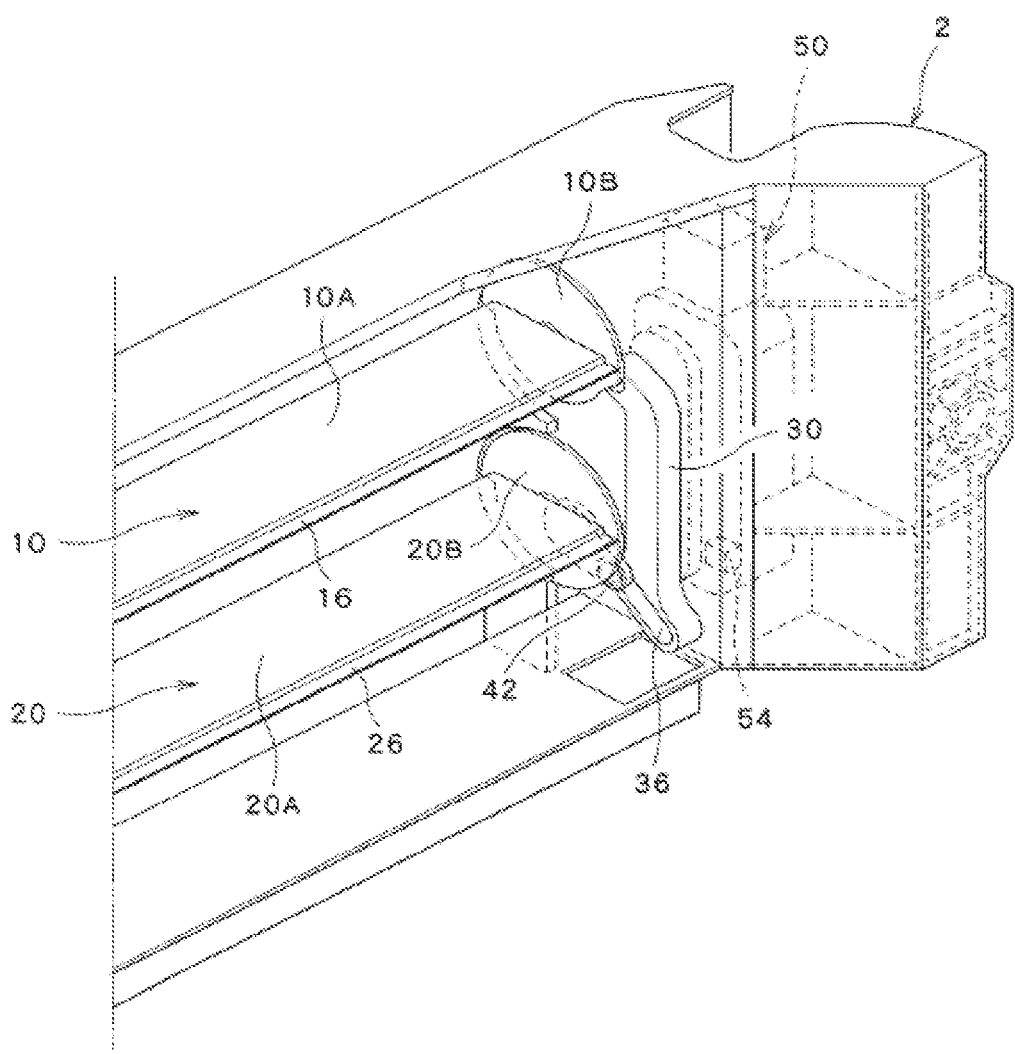
FIG. 1 is a schematic perspective view of a right half of a vehicle shutter device as viewed from an inside of a front room.

FIG. 1 is a schematic perspective view of a right half of a vehicle shutter device as viewed from an inside of a front room (for a definition of the "front room", refer to the section of Background Art at the beginning of the present description). A rear side (upper left) in FIG. 1 is an outside of the vehicle (a space outside the front room), and a front side (lower right) in FIG. 1 is an inside of the front room.

Figure 2:
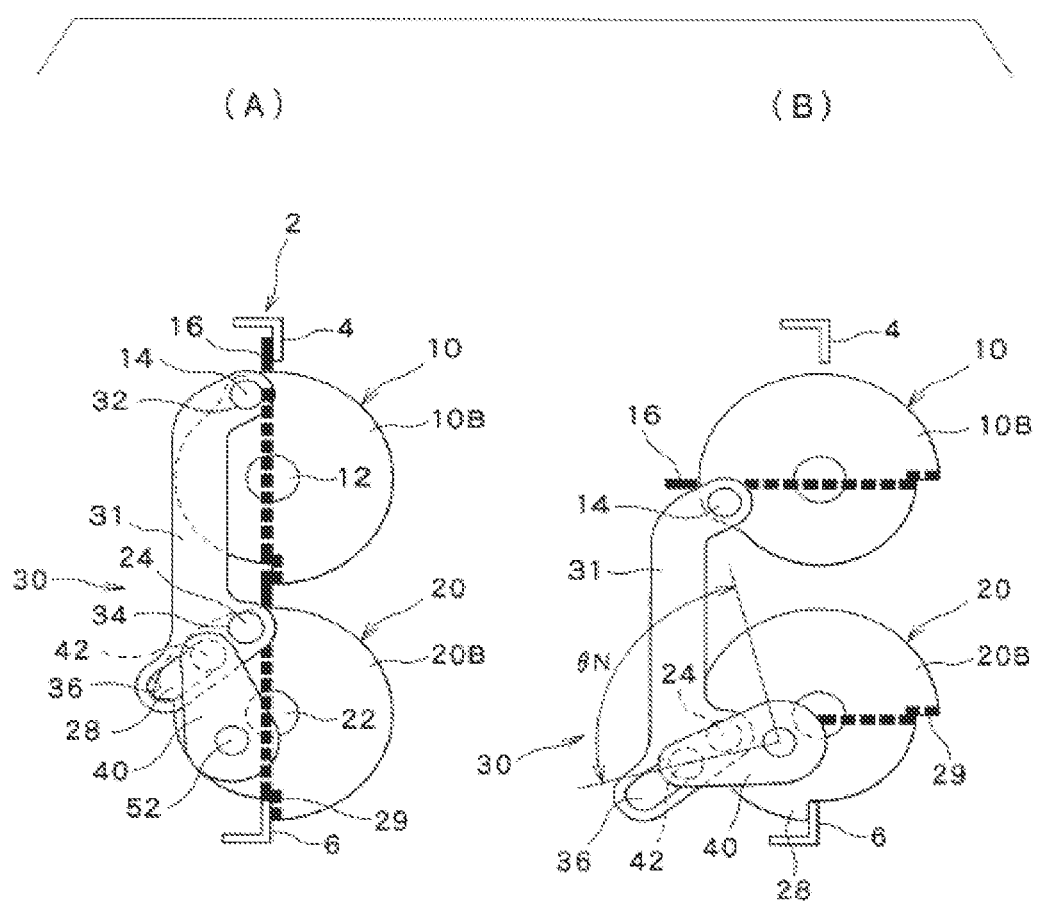
FIG. 2 is a diagram showing a configuration of a link mechanism according to an embodiment and an operation of the link mechanism in a normal state, in which (A) shows a state of the link mechanism when flaps are in a fully closed state, and (B) shows a state of the link mechanism when the flaps are in a fully open state.

As shown in FIGS. 1 and 2, the vehicle shutter device includes: a support frame 2; a first flap 10 attached to the support frame 2 so as to be rotatable about a first rotation axis; a second flap 20 attached to the support frame 2 so as to be rotatable about a second rotation axis parallel to the first rotation axis; and an actuator 50 that generates a driving force for rotating the first flap 10 and the second flap 20. Normally, the first rotation axis and the second rotation axis extend horizontally in a vehicle width direction (left and right direction) of the vehicle.

The first flap 10 includes a first closing plate 10A that opens and closes a front grille, and a first disk 10B that is provided on a side surface of the first closing plate and that extends in a radial direction of the first rotation axis. The second flap 20 includes a plate-shaped second closing plate 20A that opens and closes the front grille, and a second disk 20B that is provided on a side surface of the second closing plate 20A and that extends in a radial direction of the second rotation axis.

As shown in FIG. 2, the first flap 10 and the second flap 20 are provided with shafts 12 and 22 at both longitudinal ends (only one end side is shown in FIG. 2) thereof, respectively. These shafts 12 and 22 are rotatably supported by bearings (not shown) provided on the support frame 2. The first rotation axis and the second rotation axis pass through centers of the shafts 12 and 22, respectively.

The actuator 50 includes at least an electric rotary motor. The actuator 50 may further include a speed reduction mechanism (for example, a speed reduction gear mechanism). The actuator 50 includes an output shaft (rotary shaft) 52 that is, for example, a rotary shaft of the electric rotary motor or an output shaft of the speed reduction mechanism attached to the rotary shaft of the electric rotary motor so as to transmit power.

The shutter device includes a link mechanism 30 that transmits the driving force generated by the actuator 50 to the first flap 10 and the second flap 20. The link mechanism 30 includes a connecting rod 31 and a pivoting arm 40.

The connecting rod 31 couples the first flap 10 and the second flap 20 to each other such that the first flap 10 and the second flap 20 rotate in synchronization with each other (preferably in the same phase as each other).

The connecting rod 31 includes a first pivotally attaching portion 32 pivotally attached to the first disk 10B of the first flap 10, and a second pivotally attaching portion 34 pivotally attached to the second disk 20B of the second flap 20. Specifically, the first disk 10B is provided with a cylindrical pin 14. A hole (also referred to as a "hole 32") is formed in a part of the connecting rod 31 where the first pivotally attaching portion 32 is provided. The pin 14 is rotatably inserted into the hole 32. Similarly, the second disk 20B is provided with a cylindrical pin 24. A hole (also referred to as a "hole 34") is formed in a part of the connecting rod 31 where the second pivotally attaching portion 34 is provided. The pin 24 is rotatably inserted into the hole 34. The pins 14 and 24 are attached to the corresponding holes 32 and 34 by an attachment method that prevents the pins 14 and 24 from being easily decoupled. The connecting rod 31 may be provided with pins, and the first flap 10 and the second flap 20 may be provided with holes.

As the attachment method that prevents the pins 14 and 24 from being easily decoupled, although not shown, (i) the pins 14 and 24 may have a large diameter head portion slightly smaller than a diameter of the holes 32 and 34 of the connecting rod 31 and may be each provided with a large-diameter head, and the large-diameter heads may be forcibly passed through the holes 32 and 34 respectively, or (ii) the pins 14 and 24 may be each formed with a female screw, and after the pins 14 and 24 are passed through the holes 32 and 34 respectively, a male screw having a diameter larger than the diameter of the holes 32 and 34 may be screwed into the female screw.

The connecting rod 31 is provided with an elongated hole 36 in the vicinity of the second pivotally attaching portion 34. The elongated hole 36 is slidably engaged with a slider 42. The pivoting arm 40 has one end fixed to the output shaft 52 of the actuator 50. The pivoting arm 40 has the other end fixed with the slider 42.

As shown in FIG. 2, when the link mechanism 30 is in a normal state, as the actuator 50 pivots the pivoting arm 40, the first flap 10 and the second flap 20 rotate in conjunction with each other about 90 degrees in rotation angle ranges (hereinafter also referred to as "normal opening and closing ranges") between fully closed positions shown in (A) of FIG. 2 and fully open positions shown in (B) of FIG. 2. That is, at this time, rotation angle positions of the first flap 10 and the second flap 20 are determined according to a rotation angle position of the pivoting arm 40. A pivot angle range of the pivoting arm 40 (that is, a rotation angle range of the output shaft 52) at this time is indicated by "θN" in (B) of FIG. 2.

Since a rotation axis of the pivoting arm 40, that is, a center of the output shaft 52, does not coincide with the rotation axis of the second flap 20, that is, the center of the shaft 22, when the link mechanism 30 transitions from a state in (A) of FIG. 2 to a state in (B) of FIG. 2 (or vice versa), the slider 42 moves in the elongated hole 36 in a longitudinal direction (relatively to the elongated hole 36) as the pivoting arm 40 is pivoted (which is, however, slightly difficult to understand from (A) and (B) of FIG. 2). That is, when the second flap 20 is located at the fully closed position, the slider 42 is located at a position (first position) in the elongated hole 36, and when the second flap 20 is located at the fully open position, the slider 42 is located at a second position in the elongated hole 36.

In order to prevent the slider 42 from being locked in the elongated hole 36, the slider 42 is disposed in the elongated hole 36 with a slight clearance. That is, the slider 42 has a diameter slightly smaller than a short diameter of the elongated hole 36.

The support frame 2 is provided with frame stoppers 4 and 6. The first flap 10 is provided with a flap stopper 16 that abuts against the frame stopper 4 to restrict a rotational movement of the first flap 10. More specifically, as shown in FIG. 1, the flap stopper 16 is provided on the first closing plate 10A. The second flap 20 is provided with flap stoppers 28 and 29 that abut against the frame stopper 6 to restrict a rotational movement of the second flap 20. More specifically, the flap stoppers 28 and 29 are provided on the second disk 20B. Here, the term "frame stopper" means a stopper provided on the support frame 2, and the term "flap stopper" means a stopper provided on the flap (10 or 20). The frame stoppers 4 and 6 and the flap stoppers 28 and 29 prevent the first flap 10 and the second flap 20 from rotating beyond the fully closed positions when the first flap 10 and the second flap 20 rotate toward the fully closed positions, and prevent the first flap 10 and the second flap 20 from rotating beyond the fully open positions when the first flap 10 and the second flap 20 rotate toward the fully open positions.

As shown in (B) of FIG. 2, the second flap 20 is provided with the flap stopper 28. In (A) of FIG. 2, the flap stopper 28 is located at a position that coincides with the elongated hole 36 of the connecting rod 31, and thus is difficult to see. When the second flap 20 rotates toward the fully open position, the flap stopper 28 collides with the frame stopper 6 to prevent the second flap 20 from rotating beyond the fully open position. As shown in FIG. 2, as long as the link mechanism 30 is in the normal state, the flap stopper 28 and the frame stopper 6 also prevent the first flap 10, which is coupled to the second flap 20 via the connecting rod 31, from rotating beyond the fully open position.

As is clear from the arrangement of the stoppers described above, when the link mechanism 30 is in the normal state, the first flap 10 and the second flap 20 cannot rotate beyond the "normal opening and closing ranges" described above, and thus the output shaft 52 of the actuator 50 cannot rotate beyond the rotation angle range θN.

Coupling portions between the elements of the link mechanism 30 are configured so as not to be easily decoupled, but in an unlikely event that a coupling portion is decoupled, such decoupling can be easily detected. States in which the coupling portion is released (abnormal states) are classified into three cases and will be described below.

Figure 3:
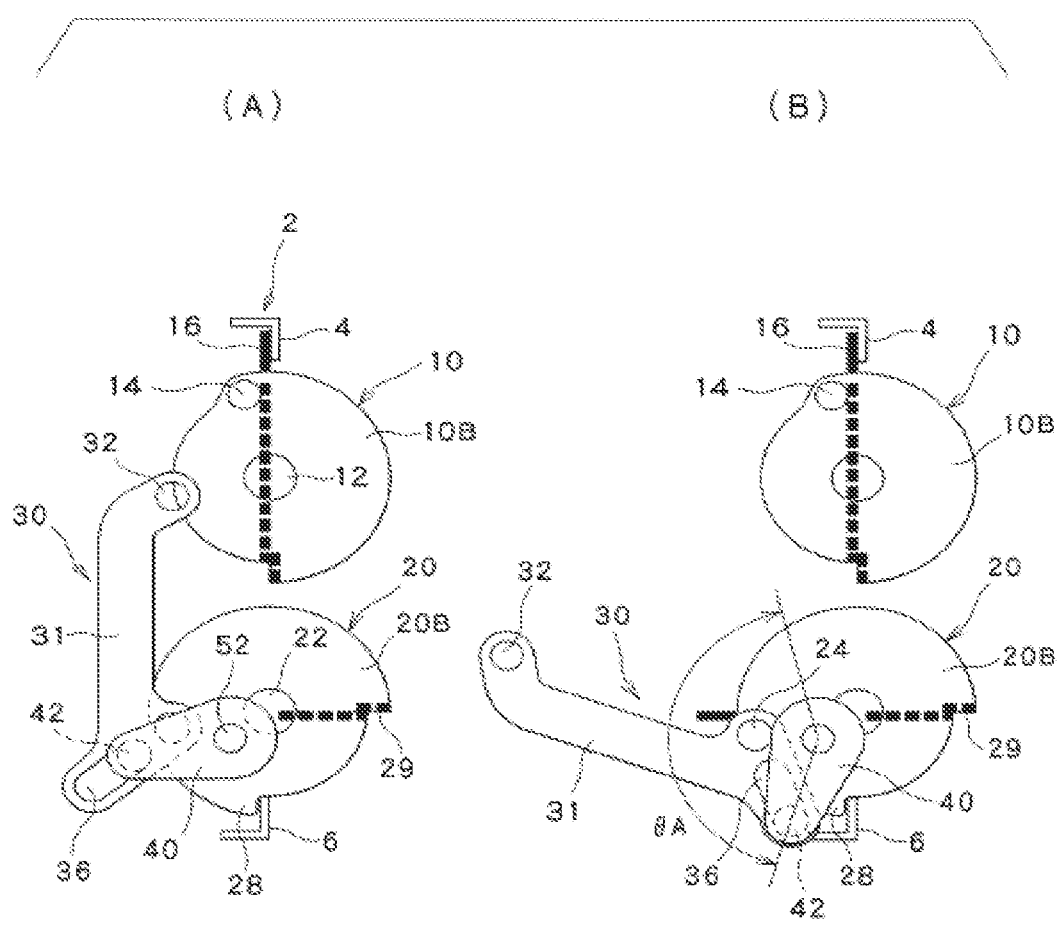
FIG. 3 is a diagram showing an operation of the link mechanism when coupling between a connecting rod and a first flap is released (first abnormal state), in which (A) shows a state of the link mechanism when an actuator is at the same rotation angle position as in (B) of FIG. 2, and (B) shows a state of the link mechanism when the actuator is displaced beyond the rotation angle position in (A).

FIG. 3 shows a first abnormal state of the link mechanism 30. The first abnormal state means a state where coupling between the connecting rod 31 and the first flap 10 is released (the pin 14 and the hole 32 are separated), and coupling and engagement of the other portions of the link mechanism 30 are maintained.

At this time, when the pivoting arm 40 is pivoted by the actuator 50 in order to rotate the first flap 10 and the second flap 20 toward the fully open positions, the first flap 10 does not rotate, but the second flap 20 rotates in the same manner as in the normal state and rotates to the fully open position where the flap stopper 28 collides with the frame stopper 6 (see (A) of FIG. 3).

In the first abnormal state, the coupling between the first pivotally attaching portion 32 of the connecting rod 31 and the pin 14 of the first flap 10 is released, so that the connecting rod 31 can freely rotate about the pin 24 of the second flap 20. Therefore, the output shaft 52 of the actuator 50 can be rotated until the slider 42 attached to the pivoting arm 40 reaches an end of the elongated hole 36 (that is, a third position farther from the first position than the second position). The pivot angle range of the pivoting arm 40 (that is, the rotation angle range of the output shaft 52) is indicated by "θA" in (B) of FIG. 3.

Rotation of the output shaft 52 of the actuator 50 beyond the rotation angle range θN is detected by a rotation angle detection unit 54 (schematically shown only in FIG. 1) provided in the actuator 50. The rotation angle detection unit may be, for example, a rotary encoder attached to the electric rotary motor of the actuator 50. The output shaft 52 of the actuator 50 rotating beyond the rotation angle range θN means that an abnormality has occurred in the link mechanism 30. Such abnormality can be notified to an occupant by, for example, a notification unit. As the notification unit, for example, a warning lamp provided in a meter unit of an instrument panel and/or a chime or a buzzer may be used. When the rotation angle detection unit detects that the output shaft 52 of the actuator 50 rotates beyond the rotation angle range θN, the actuator 50 may be stopped (the actuator 50 may come to an emergency stop) in order to prevent the link mechanism 30 and the actuator 50 from being damaged. The notification and/or the stop of the actuator 50 based on the detection described above can be performed via a control unit (not shown).

Figure 4:
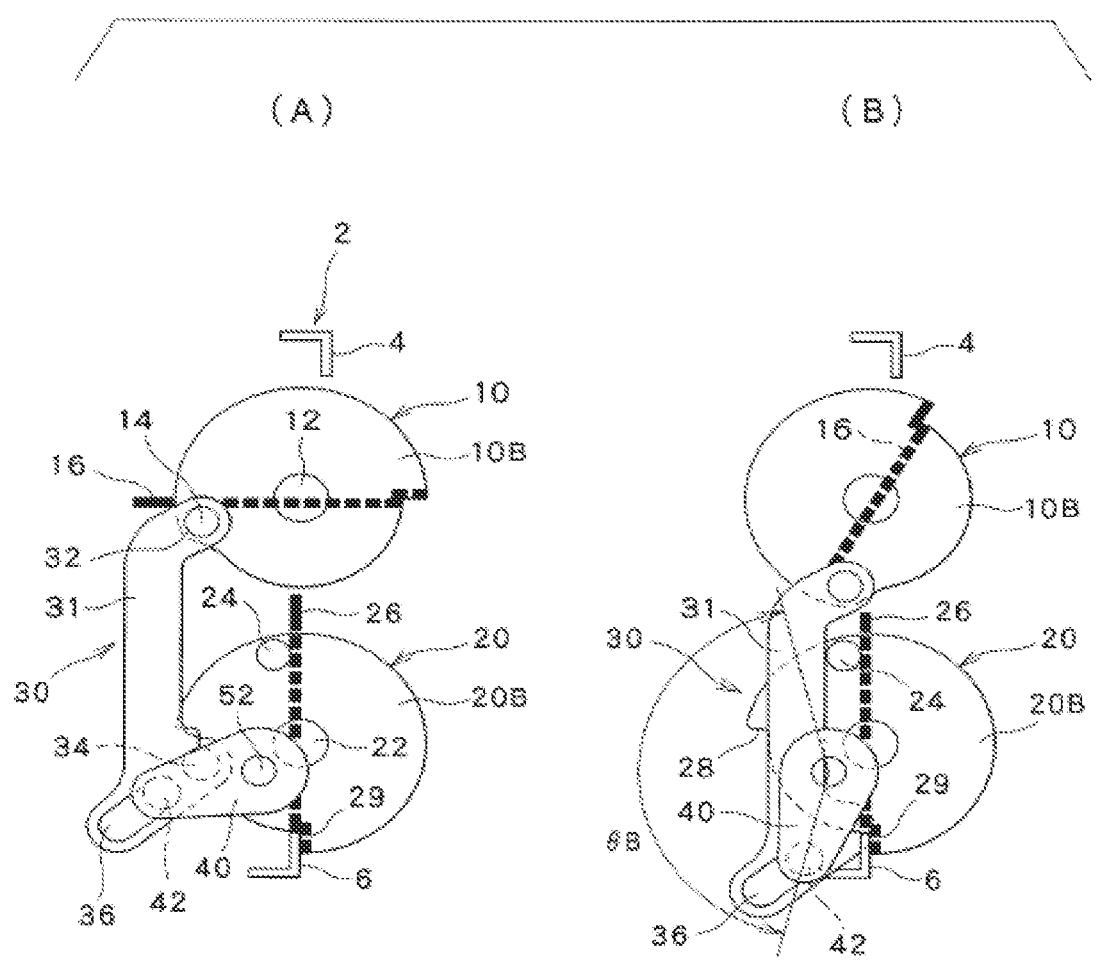
FIG. 4 is a diagram showing an operation of the link mechanism when coupling between the connecting rod and a second flap is released (second abnormal state), in which (A) shows a state of the link mechanism when the actuator is at the same rotation angle position as in (B) of FIG. 2, and (B) shows a state of the link mechanism when the actuator is displaced beyond the rotation angle position in (A).

FIG. 4 shows a second abnormal state of the link mechanism 30. The second abnormal state means a state where coupling between the connecting rod 31 and the second flap 20 is released (the pin 24 and the hole 34 are separated), and coupling and engagement of the other portions of the link mechanism 30 are maintained.

In this case, when the pivoting arm 40 is pivoted by the actuator 50 in order to rotate the first flap 10 and the second flap 20 toward the fully open positions, the second flap 20 does not rotate, but the first flap 10 rotates in the same manner as in the normal state and reaches the fully open position ((A) of FIG. 4). When the pivoting arm 40 is further pivoted, the output shaft 52 of the actuator 50 can rotate beyond the rotation angle range θN because no stopper is present to prevent the first flap 20 from rotating beyond the fully open position. A rotation angle range of the output shaft 52 of the actuator 50 at this time is indicated by "θB" in (B) of FIG. 4. Also, in this case, the rotation angle detection unit detects that the output shaft 52 of the actuator 50 rotates beyond the rotation angle range θN, and the notification unit notifies the occupant that an abnormality has occurred in the link mechanism 30.

Figure 5:
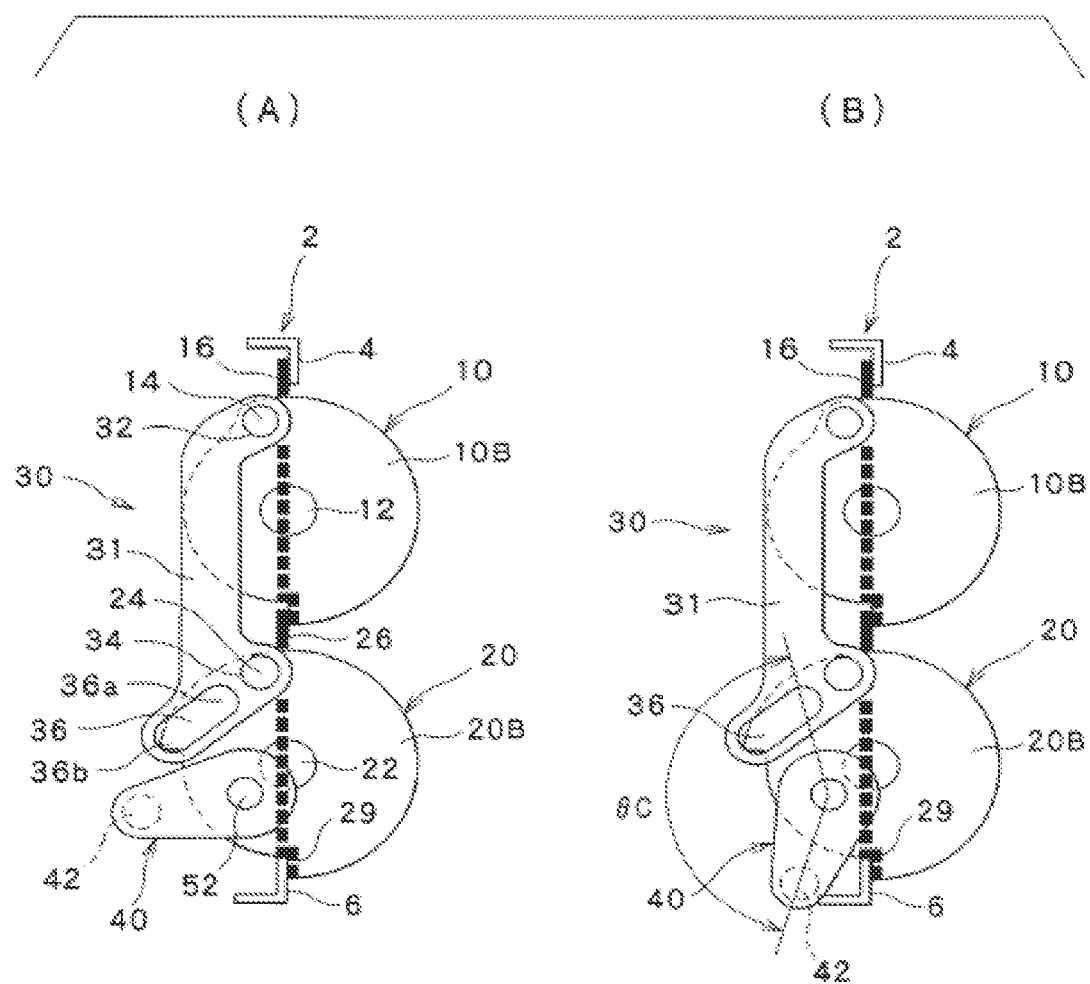
FIG. 5 is a diagram showing an operation of the link mechanism when coupling between the connecting rod and a pivoting arm is released (third abnormal state), in which (A) shows a state of the link mechanism when the actuator is at the same rotation angle position as in (B) of FIG. 2, and (B) shows a state of the link mechanism when the actuator is displaced beyond the rotation angle position in (A).

FIG. 5 shows a third abnormal state of the link mechanism 30. The third abnormal state means a state where coupling between the connecting rod 31 and the pivoting arm 40 is released (the elongated hole 36 and the slider 42 are separated), and coupling and engagement of other the portions of the link mechanism 30 are maintained.

In this case, even when the pivoting arm 40 is pivoted by the actuator 50 in order to rotate the first flap 10 and the second flap 20 toward the fully open positions, both the first flap 10 and the second flap 20 remain at original rotation angle positions without rotating. Since the movement of the pivoting arm 40 is not restricted at all, the output shaft 52 of the actuator 50 can rotate beyond the rotation angle range N. In FIG. 5, (B) shows a rotation angle range "θC" of the output shaft 52 of the actuator 50 in the third abnormal state. It is clear from the structure of the link mechanism 30 that the output shaft 52 can freely rotate beyond the rotation angle range θC until the output shaft 52 collides with, for example, the connecting rod 31, but in actual operation, an operation of the actuator 50 is stopped when the output shaft 52 is about to exceed the rotation angle range θC. Also, in this case, the rotation angle detection unit detects that the output shaft 52 of the actuator 50 rotates beyond the rotation angle range θN, and the notification unit notifies the occupant that an abnormality has occurred in the link mechanism 30.

According to the embodiment, it is possible to easily determine that coupling or engagement between elements provided in the link mechanism 30 is released. In many cases, in order to control opening degrees of the first flap 10 and the second flap 20, the rotation angle detection unit (54) for detecting a rotation angle of the output shaft 52 of the actuator 50 is provided, so that it is not necessary to provide another rotation angle detection unit. Therefore, it is possible to prevent or limit an increase in cost of the shutter device for realizing the above functions.

Figure 6:
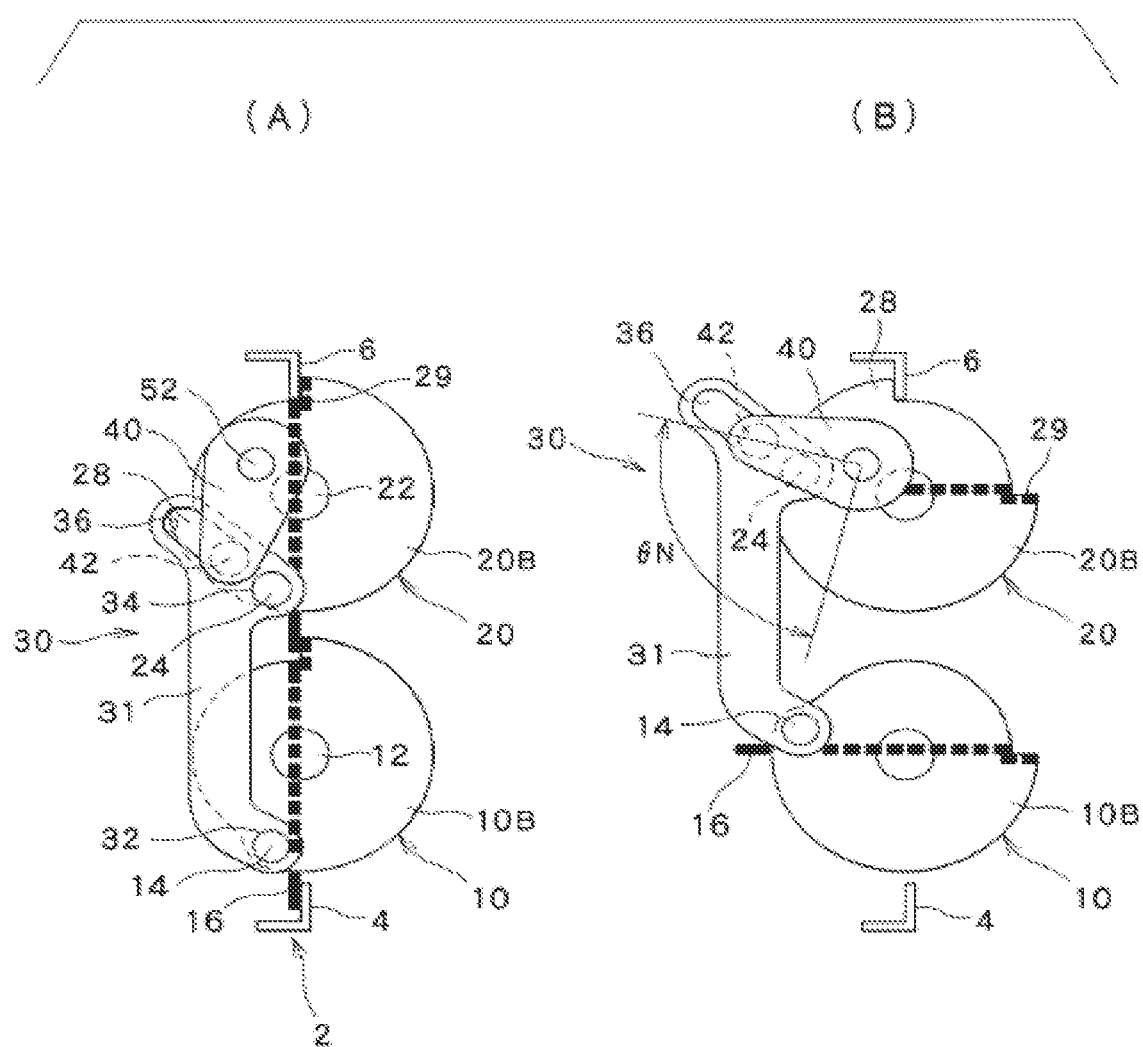
FIG. 6 is a diagram showing a configuration of a link mechanism according to another embodiment and an operation of the link mechanism in a normal state, in which (A)

The actuator 50 and the link mechanism 30 may be arranged as shown in FIG. 6 in a manner turned upside down with respect to the embodiment shown in FIGS. 1 to 5. A shutter device shown in FIG. 6 operates in the same manner as the shutter device shown in FIGS. 1 to 5.

REFERENCE SIGNS LIST 2 support frame
4, 16; 6, 29; 6, 28 stopper
10 first flap
20 second flap
30 link mechanism
31 connecting rod
32 first pivotally attaching portion
34 second pivotally attaching portion
40 pivoting arm
50 actuator

The invention claimed is:

1. A vehicle shutter device comprising:
a support frame;
a first flap attached to the support frame so as to be rotatable about a first rotation axis;
a second flap attached to the support frame so as to be rotatable about a second rotation axis parallel to the first rotation axis;
one actuator configured to generate a driving force for rotating the first flap and the second flap;
a link mechanism configured to transmit the driving force generated by the actuator to the first flap and the second flap, the link mechanism including a connecting rod that couples the first flap and the second flap to each other such that the first flap and the second flap rotate in synchronization with each other, a first pivotally attaching portion of the connecting rod being pivotally attached to the first flap, a second pivotally attaching portion being pivotally attached to the second flap; and
a stopper configured to, when the link mechanism is in a normal state, prohibit each of the first flap and the second flap from being displaced beyond a normal opening and closing range between a fully open position and a fully closed position,
wherein the link mechanism is configured such that when coupling between the connecting rod and the first flap is released in the first pivotally attaching portion in a state where coupling between the connecting rod and the second flap is maintained in the second pivotally attaching portion, the actuator is allowed to rotate beyond a normal rotation range corresponding to the normal opening and closing ranges of the first flap and the second flap.

2. The shutter device according to claim 1, wherein the connecting rod is provided with an elongated hole, the elongated hole is engaged with a slider configured to be driven by the actuator so as to slide in the elongated hole, and the elongated hole has a length such that when the coupling between the connecting rod and the first flap is released in the first pivotally attaching portion in the state where the coupling between the connecting rod and the second flap is maintained in the second pivotally attaching portion, the actuator is allowed to rotate beyond the normal rotation range.

3. The shutter device according to claim 2, wherein the stopper comprises a frame stopper provided on the support frame, and a flap stopper provided on the second flap, the flap stopper being configured to collide with the frame stopper so as to prevent the second flap from rotating beyond the fully open position, when the link mechanism is in the normal state and the second flap is in the fully closed position, the slider is located at a first position in the elongated hole, when the link mechanism is in the normal state and the second flap is in the fully open position, the slider is located at a second position in the elongated hole, and the elongated hole extends to a third position farther from the first position than the second position.

4. The shutter device according to claim 2, further comprising:
a pivoting arm whose one end is fixed to an output shaft of the actuator and the other end carries the slider,
wherein when the link mechanism is in the normal state, angle positions of the first flap and the second flap are determined according to an angle position of the pivoting arm.

* * * * *